US010147424B1

(12) United States Patent
Indyk et al.

(10) Patent No.: US 10,147,424 B1
(45) Date of Patent: Dec. 4, 2018

(54) GENERATING SELF-SUPPORT METRICS BASED ON PARALINGUISTIC INFORMATION

(71) Applicant: INTUIT INC., Mountain View, CA (US)

(72) Inventors: Benjamin Indyk, San Diego, CA (US); Igor A. Podgorny, Mountain View, CA (US); Raymond Chan, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 15/334,825

(22) Filed: Oct. 26, 2016

(51) Int. Cl.
*G10L 15/22* (2006.01)
*G10L 25/63* (2013.01)
*G10L 25/87* (2013.01)
*G10L 15/30* (2013.01)
*G10L 15/06* (2013.01)

(52) U.S. Cl.
CPC ............ *G10L 15/22* (2013.01); *G10L 15/063* (2013.01); *G10L 15/30* (2013.01); *G10L 25/63* (2013.01); *G10L 25/87* (2013.01)

(58) Field of Classification Search
USPC ............................ 704/7, 246, 247, 251, 252
See application file for complete search history.

(56) References Cited

U.S. PATENT DOCUMENTS

2011/0184721 A1* 7/2011 Subramanian ...... G10L 19/0018 704/4
2013/0262096 A1* 10/2013 Wilhelms-Tricarico .................... G10L 25/90 704/202
2015/0127343 A1* 5/2015 Mullor .................... G10L 17/26 704/244
2015/0170053 A1* 6/2015 Miao .................... G06N 99/005 706/12
2015/0294669 A1* 10/2015 Zhang .............. G06F 17/30026 704/235
2016/0104486 A1* 4/2016 Penilla .................... H04L 67/12 704/232

* cited by examiner

*Primary Examiner* — Leonard Saint Cyr
(74) *Attorney, Agent, or Firm* — Patterson + Sheridan, LLP

(57) ABSTRACT

The present disclosure includes techniques for selecting a response to an audio stream query. In one embodiment, an application server receives an audio stream query including content spoken by a user interacting with a voice-user interface. The application server determines a set of paralinguistic features from the audio stream query, and estimates at least a first attribute of the user based on the set of paralinguistic features. The application server identifies subject matter corresponding to the spoken content in the audio stream query, and determines two or more query responses corresponding to the identified subject matter. The application server then selects one of the query responses to present to the user based, at least in part, on the attribute of the user estimated from the set of paralinguistic features.

20 Claims, 5 Drawing Sheets

GENERATING SELF-SUPPORT METRICS BASED ON PARALINGUISTIC INFORMATION

BACKGROUND

Field

The present disclosure generally relates to computer software metrics that tailor a user's experience with a software application or online service. More specifically, the present disclosure provides techniques for generating metrics that tailor the response provided to a user's spoken self-support query based on paralinguistic information extracted from the user's query.

Related Art

Software is commonly offered in a distributed environment, where the software is installed on a computer, installed as an application on a mobile device, or provided through an online service accessed through a web browser. The software is provided as part of a service, such as a financial accounting or tax preparation application. Service providers frequently update the underlying components of the service to improve user experience. For example, potential updates or changes to the service are often tested using A/B testing, multivariate testing, multi-armed bandit testing, etc. With A/B testing, for example, some users experience a first version (A) of a feature of the software, while other users experience a second version (B) of the feature of the software. The provider evaluates user reactions to A and B as part of the A/B testing.

In the context of A/B testing, uplift modeling generally refers to modeling that can be used to identify user segments that react more favorably to one version (A) of a feature, versus another version (B). Uplift modeling is used with A/B testing results to determine whether choice A or B generates a more favorable reaction from users. However, it is often difficult to determine why A or B generated a favorable reaction (or why A or B generated an unfavorable reaction) for various users, as many attributes that could play a factor in such reactions, such as the emotional states of the users, are unknown to the computer software provider, and are difficult to predict.

Thus, determining certain attributes of a user exposed to a variant in an A/B test, such as an emotional state attribute, could be useful in evaluating which version of a feature (A or B) to ultimately implement and distribute for different users of a software application or online service.

SUMMARY

One embodiment includes a computer-implemented method for selecting a response to an audio stream query. An application server receives an audio stream query including content spoken by a user interacting with a voice-user interface. The application server determines a set of paralinguistic features from the audio stream query, and estimates at least a first attribute of the user based on the set of paralinguistic features. The application server identifies subject matter corresponding to the spoken content in the audio stream query, and determines two or more query responses corresponding to the identified subject matter. The application server then selects one of the query responses to present to the user based, at least in part, on the attribute of the user estimated from the set of paralinguistic features.

In another embodiment, a non-transitory computer-readable storage medium contains instructions that, when executed by one or more processors, perform an operation for selecting a response to an audio stream query. The operation includes receiving the audio stream query including content spoken by a user interacting with a voice-user interface, determining a set of paralinguistic features from the audio stream query, estimating at least a first attribute of the user based on the set of paralinguistic features, identifying subject matter corresponding to the spoken content in the audio stream query, determining two or more query responses corresponding to the identified subject matter, and selecting one of the query responses to present to the user based, at least in part, on the attribute of the user estimated from the set of paralinguistic features.

In another embodiment, a system includes one or more processors and a memory storing one or more applications, which, when executed on the one or more processors perform an operation for selecting a response to an audio stream query. The operation includes receiving the audio stream query including content spoken by a user interacting with a voice-user interface, determining a set of paralinguistic features from the audio stream query, estimating at least a first attribute of the user based on the set of paralinguistic features, identifying subject matter corresponding to the spoken content in the audio stream query, determining two or more query responses corresponding to the identified subject matter, and selecting one of the query responses to present to the user based, at least in part, on the attribute of the user estimated from the set of paralinguistic features.

DETAILED DESCRIPTION

Figure 1:
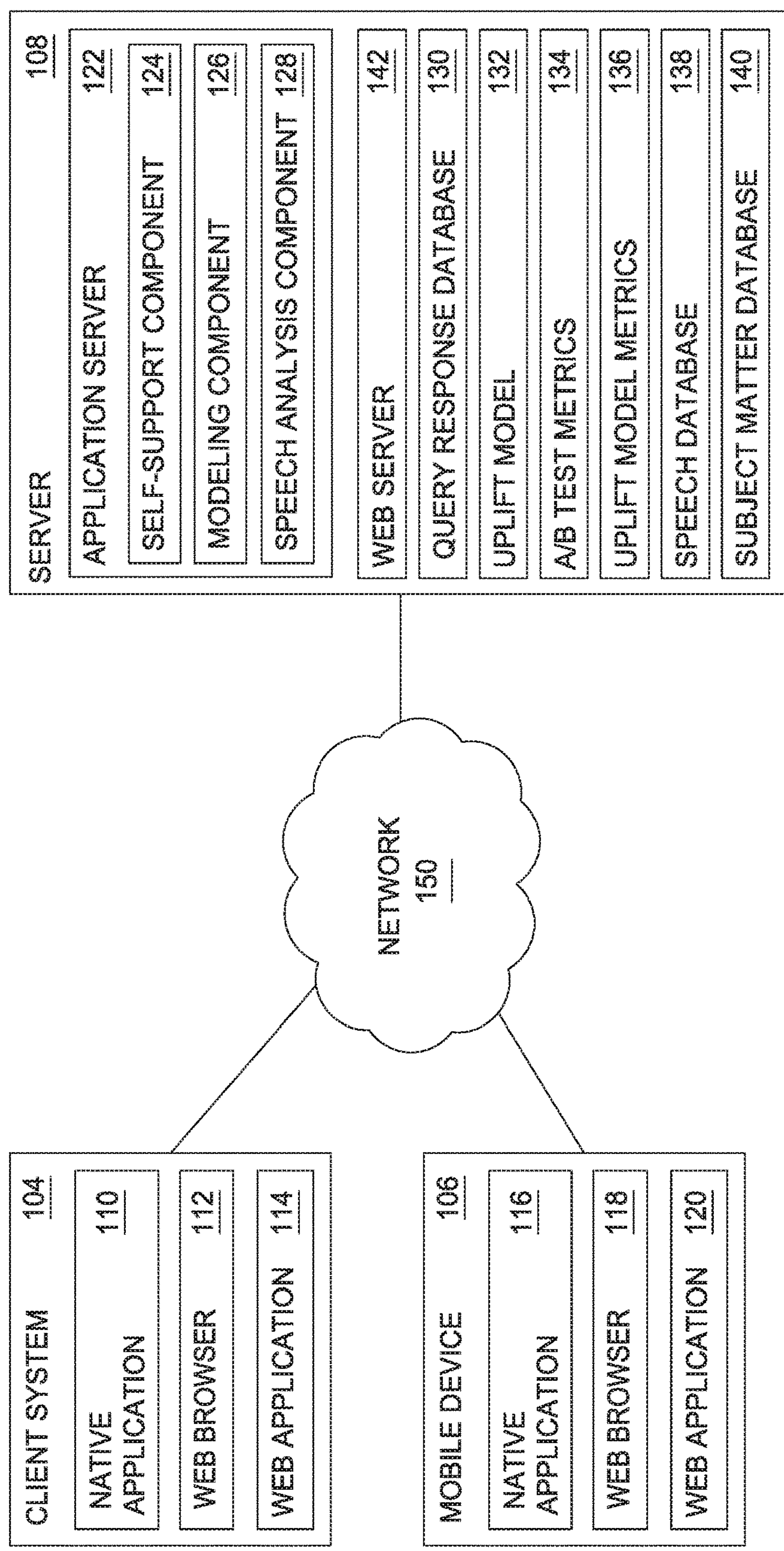
FIG. 1 illustrates an example computing environment that may be used to generate metrics for a self-support component based on paralinguistic information extracted from voice/speech of a user, according to one embodiment.

Embodiments presented herein provide techniques for generating metrics for a self-support component based on paralinguistic information extracted from voice/speech of a user. Self-support generally refers to help provided to a user of an application or online service that is self-directed by the user, e.g., where the user searches for help pages regarding a given topic. Self-support differs from assisted support, in which the user interacts with support personal to receive help related to the application or online service.

Software applications and online services may include voice-user interfaces that support a spoken interaction between a user and the application or service. That is, the software may support user input in the form of a spoken statement. For example, a user may input voice/speech to initiate services or processes, or input requests or queries. The voice/speech of the user may be captured as an audio stream by a computing device running the software application being used by the user. The self-support query may be input by the user at any number of points of user experience with the application (e.g., could be input at any time during the user's experience, or could only be input at one or more particular points throughout the user's experience). In some cases, the speech may be processed locally on the device—that is converted from a spoken statement to a text string representing the statement. However, in other cases, an application executing on a server identifies content in the audio stream and extracts paralinguistic information from the audio stream. Doing so allows speech command requests to be input using devices with more limited processing capability (e.g., mobile phones).

Speech recognition and pattern recognition techniques (e.g., using known techniques or software, such as, natural language processing, Hidden Markov models, neural networks, deep feedforward and recurrent neural networks, etc.) are used to identify content in an audio stream. Content extracted from the audio stream is used to identify subject matter by comparing the extracted content to a subject matter in a subject matter database. The identified subject matter in the audio stream query is then used to identify two or more possible query responses corresponding to the identified subject matter from a query response database to present to the user in response to the user's self-support query. The responses may include information, such as help content, user guides, documentation, etc., that aids a user in interacting with the software application.

In one embodiment, in addition to identifying content in a spoken self-support query (or other spoken statement input into an application or service by a user), paralinguistic information can be extracted from the query. The paralinguistic information generally refers to aspects of a person's speech that do not include the spoken words. That is, apart from the words spoken by a user, the paralinguistic information includes features such as volume, tone, word pace, pauses, and inflections made while the user is speaking.

Paralinguistic information may be extracted from the audio stream using known techniques or software, such as, EmoVoice, OPENEARS®, Yaafe, Voice Search DB with Accent and Tone, VOICEVAULT®, AT&T® APIs, etc. Paralinguistic generally refers to the phenomena that are modulated onto or embedded into a verbal message, including acoustics and linguistics of the verbal message. For example, low level descriptors may be extracted from frames of the audio stream (e.g., 10-30 ms frames). These acoustic low level descriptors may include intonation (pitch, etc.), intensity (energy, Taeger functions, etc.), linear prediction cepstral coefficients (LPCC), perpetual linear prediction (PLP) parameters, cepstral coefficients (Mel frequency cepstral coefficients (MFCCs), etc.), formants (amplitude, position, width, etc.), spectrum (Mel frequency bands (MFB), NMF-based components, MPEG-7 audio spectrum projection, roll-off, etc.), TF transformation (wavelets, Gabor, etc.), harmonicity (harmonics-to-noise ratio (HNR), noise-to-harmonics ratio (NHR), etc.), and/or perturbation (jitter, shimmer, etc.). Further, the linguistic low level descriptors may include linguistic entities (phoneme sequences, word sequences, etc.), non-linguistic strings (laughter, sighs, etc.), and/or disfluencies (false starts, filled/unfilled pauses, etc.).

The paralinguistic information extracted from the audio stream may be used by a speech analysis component on the server to determine one or more attributes of the user. For example, the low level descriptors extracted from the audio stream may be compared to a speech database that stores attributes correlated to different low level descriptors. Therefore the low level descriptors extracted from the audio stream can be matched to different attributes. The attributes that may be determined may include gender of the user, age (or age range) of the user, one or more emotional states of the user (e.g., angry, afraid, positive, negative, joyful, happy, bored, alert, tranquil, excited, warm, aggressive, friendly, gloomy, etc.), etc. It should be noted that the attributes may not always be determined correctly, and may only be estimated with a probability that they are correct. In some cases, the application may be configured to assign attributes if the probability is above a minimum confidence value.

Note, some information about emotions of a user may be determined from the words included in the audio stream, i.e., the words spoken by the user. However, use of paralinguistic information to determine an emotional state of the user may provide a more accurate measure of the emotional state of the user than the information extracted from the actual words. For example, a specific set of words (e.g., "Is the application worth the cost?") may be spoken with a negative or neutral tone that may not be detectable by mere natural language processing to extract the words from the audio stream query alone. Accordingly, using paralinguistic information to determine attributes of a user may more accurately determine attributes of the user as compared to other methods, such as natural language processing.

Paralinguistic information may improve the ability of an application to deliver effective self-support. Specifically, users can input a spoken self-support query, requesting help regarding the application or online service. Paralinguistic information extracted from the user's spoken query can be used to help determine what response to provide to the user. In particular, a response that is known to result in favorable user reactions for users that have the same estimated attribute (such as an estimated emotional state) of the user that submitted the query can be chosen, as opposed to a response that is known to result in unfavorable user reactions for users that have the same estimated attribute of the user that submitted the query. For example, if users with a positive emotional state are learned by the application or service to react more favorably to a first response than to a second response, and if the user has an estimated positive emotional state based on the paralinguistic data extracted from the user's spoken self-support query, the first response would be chosen.

For example, A/B testing may be used to evaluate user reactions to two different possible query responses (A and B) to spoken self-support queries with content related to a specific subject matter. In conjunction with evaluating the user reactions to the different responses (A and B), attributes of each user can also be estimated by extracting paralinguistic information from the spoken query in each instance of the A/B test. User reactions to the two query responses (A/B) and the corresponding estimated attributes of the users may be used to train an established uplift model. As known, uplift models can be used to identify user segments that react more favorably to one version (A) of a feature, versus another version (B). The uplift model can be used as trained to determine whether response A or B generated a more favorable user response for users having a particular attribute. For example, users with a positive emotional state may respond more favorably to response A, while users with a negative emotional state may respond more favorably to response B. Thus, using the uplift model, one or more self-support metrics may be created for the specific subject matter of the A/B test that include instructions to provide response A when receiving a spoken query having content related to the specific subject matter from a user whose paralinguistic information indicates a positive emotional state, and providing response B after receiving a spoken query having content related to the specific subject matter from a user whose paralinguistic information indicates a negative emotional state.

Because the self-support metrics tailor a future user's query response based on an attribute of the user estimated using the paralinguistic information extracted from the user's spoken query, the query response is likely to result in a favorable user reaction. Different aspects of these techniques are described in more detail herein, along with additional examples of how the techniques may be used to generate self-support metrics for a software application.

FIG. 1 illustrates an example computing environment 100 that may be used to generate metrics for a self-support component based on paralinguistic information extracted from voice/speech of a user, according to one embodiment. As shown, the environment 100 includes a client system 104, a mobile device 106, and a server 108, which communicate via a network 150. Additionally, server 108 is executing an application server 122 and a web server 142. The application server 122 includes self-support component 124, modeling component 126, and speech analysis component 128. As shown, the server 108 includes a query response database 130, uplift model 132, A/B test metrics 134, uplift model metrics 136, speech database 138, and subject matter database 140. Client system 104 is executing a native application 110 and a web browser 112. Web application 114 is executing on the web browser 112. Similarly, Mobile device 106 is executing native application 116 and web browser 118. Web application 120 is executing on the web browser 118. Self-support queries spoken by users are captured by a native application 110, 116 or a web application 114, 120. The web server 142 receives the queries spoken by the users. The application server 122 analyzes the spoken queries received by the web server 142, and then the web server 142 provides responses generated by the application server 122 to the users at the native application 110, 116 or web application 114, 120.

Figure 2:
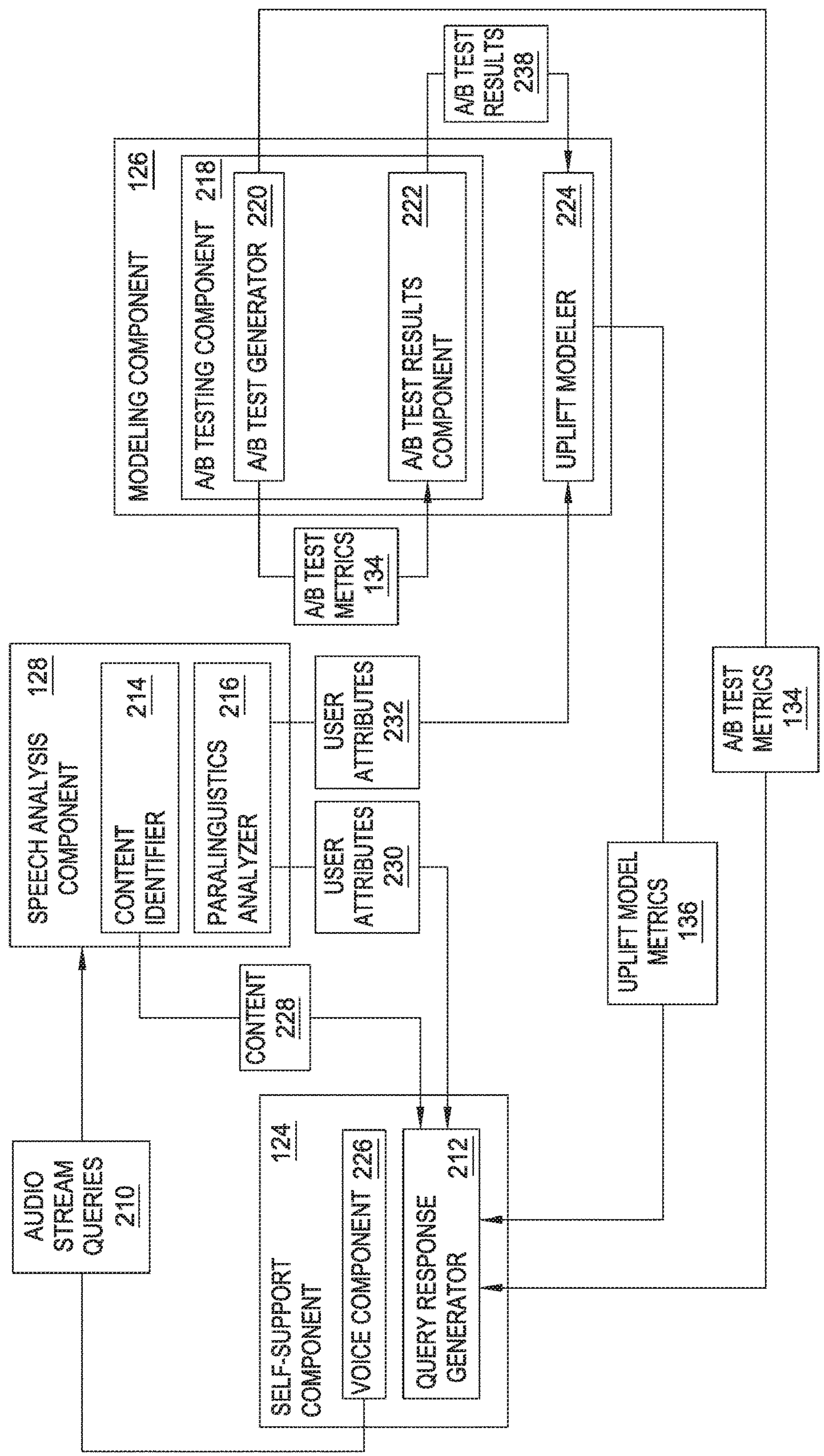
FIG. 2 illustrates components of the computing environment in FIG. 1, according to one embodiment.

FIG. 2 illustrates components of the computing environment 100 in FIG. 1, according to one embodiment. Specifically, FIG. 2 illustrates the components of the application server 122 on server 108 (self-support component 124, speech analysis component 128, and modeling component 126). The self-support component 124 includes a voice component 226 that receives audio stream queries 210 input by a user. For example, a user interacting with a native application 110 on a client system 104 may cause the native application 110 to record the spoken query of the user through a voice-user interface of the application 110. This spoken audio stream query 210 is then received at the server 108 at the voice component 226. The user may input the spoken audio stream query 210 using any native application 110, 116 or any web application 114, 120 at either a client system 104 or a mobile device 106.

An audio stream query 210 received at the voice component 226 is then analyzed by the speech analysis component 128. For example, the content identifier 214 generates a predicted text representation of the audio stream query 210 (content 228). To do so, the content identifier 214 may use a variety of speech recognition and pattern recognition techniques, such as natural language processing, Hidden Markov models, neural networks, deep feedforward and recurrent neural networks, etc. In addition to evaluating the audio stream to identify text content, other aspects of the audio stream that do not include the spoken words are evaluated by the speech analysis component 128. For example, the paralinguistics analyzer 216 extracts paralinguistic information to estimate an attribute, such as an emotional state of the user. The paralinguistics analyzer 216 extracts paralinguistic data from the audio stream query 210 using techniques or software like EmoVoice, OPENEARS®, Yaafe, Voice Search DB with Accent and Tone, VOICEVAULT®, AT&T® APIs, etc. The paralinguistics analyzer 216 then estimates one or more attributes 230, 232 of the user based on the extracted paralinguistic data. For example the paralinguistics analyzer 216 compares the low level descriptors extracted from the audio stream query 210 to different low level descriptors (as described above) or combinations of low level descriptors corresponding to user attributes in speech database 138 stored at server 108. For example, low level descriptors, including pitch and intensity, may be used to estimate whether the user has a positive or negative emotional state attribute.

Modeling component 126 includes an A/B testing component 218 and an uplift modeler 224. The A/B testing component 218 includes A/B test generator 220 and A/B test results component 222. The A/B test generator 220 generates A/B test metrics 134 for conducting an A/B test to compare user reactions to two different responses (A and B) to queries related to a particular subject matter. A test administrator may input the parameters for an A/B test that the test administrator wants to perform, and the A/B test generator 220 will define A/B test metrics 134 with instructions to perform and evaluate such a test. In one embodiment, there may be more than two different responses tested in the A/B test. The A/B test metrics 134 generated by the A/B test generator 220 may be stored at server 108.

For example, the test administrator may want to conduct an A/B test to compare user reactions to two different responses (A and B) provided in response to queries related to an education tax credit. The A/B test generator 220 generates the metrics 134 for conducting the test. For example, the A/B test metrics 134 may include instructions to alternate providing responses A and B for the next 100 instances of a received spoken self-support query related to the education tax credit (such that, for 100 users submitting a query related to the education tax credit, 50 will receive response A, and 50 will receive response B).

The A/B test metrics 134 may also include instructions for collecting and evaluating A/B test results 238. For example, the A/B test metrics 134 may define a set of possible user reactions, such as: (a) the user submits no further queries, (b) the user submits an additional self-support query, and (c) the user requests assisted-support. The A/B test metric 134 may define a favorability score for a variety of defined user reactions or responses. For example, on a favorability scale of 1 to 10, with 1 being the least favorable user reaction, and 10 being the most favorable user reaction, the user reaction (a) may have a favorability score of 10, user reaction (b) may have a favorability score of 5, and user reaction (c) may have a favorability score of 1.

The A/B test results component 222, collects the results from the A/B testing. For example, after a user receives response A or B in accordance with the A/B test metrics 134, the A/B test results component 222 detects a user response to the variant of the A/B test presented to that user. According to the example A/B test metrics 134 described above, the A/B test results component 222 monitors the user activity subsequent to the user receiving response A or response B to detect user reaction (a), (b), and/or (c). In one embodiment, the A/B test results component 222 may monitor a certain number of user actions after the user's receipt of response A or B. In one embodiment, the A/B test results component

222 may monitor user actions for a certain amount of time after the user receives response A or B. In another embodiment, the A/B test results component 222 may monitor the user actions only until one of the user reactions defined by the A/B test metric 134 is detected.

Once the A/B test results component 222 detects one or more user reactions defined by the A/B test metric 134, the A/B test results component 222 determines an A/B test results 238 score using the favorability scores defined by the A/B test metric 134. For example, if the only user reaction detected is user reaction (a) (having a favorability score of 10), the A/B test results 238 score for that user would be 10. The A/B test metrics 134 may define how to calculate the A/B test results 238 score if multiple defined user reactions are detected. For example, the A/B test metrics 134 may define that the A/B test results 238 score will include only the favorability score of the user reaction having the lowest favorability score—so if A/B test results component 222 detects user reactions (a) (having a favorability score of 10), (b) (having a favorability score of 5), and (c) (having a favorability score of 1), the A/B test results 238 score for that user would be 1.

In addition, for each audio stream query 210 that becomes part of the A/B test (e.g., the user receives a response to the query according to the A/B test metrics 134, and the A/B test results component 222 collects the user's reaction), the paralinguistic analyzer 216 extracts paralinguistic information from the audio stream query 210 to estimate an attribute of the user 232. For example, the attribute 232 may be the positive/negative emotional state of the user, and the paralinguistics analyzer 216 may determine a score for the user's positive/negative emotional state. While any numerical range (or fixed states) may be used, as an example, assume a positive/negative emotional state is determined using a scale between −1 and +1, with −1 being the negative extreme, and +1 being the positive extreme. In such a case, a score from −1 up to 0 may be considered a negative emotional state, and 0 to +1 may be considered a positive emotional state. The attribute 232 determined for each audio stream query 210 that becomes part of the A/B test is included in a set of attributes 232 that corresponds to the A/B test results 238 for that A/B test.

The uplift modeler 224 of the modeling component 126 uses a set of A/B test results 238 and the corresponding set of user attributes 232 for a particular A/B test to train uplift model 132. For example, with respect to the example positive/negative emotional state attribute described above and the example A/B test described above for queries related to an education tax credit, the uplift modeler 224 would train the uplift model 132 using 50 test results for the response A, 50 test results for the response B. The uplift modeler 224 would also train the uplift model 132 using 100 user positive/negative emotional state attributes 232, each corresponding to one of the 100 total A/B test results 238. The uplift model 132 may be stored at server 108.

Once the uplift model 132 has been trained using a set of A/B test results 238 for an A/B test related to particular subject matter and a corresponding set of user attributes 232, the uplift model 132 determines which query response (A or B) generated the most favorable user reaction for users submitting a query related to the particular subject matter of the A/B test when the user has a particular attribute. For example, the uplift modeler 224 may determine which response (A or B) generated the most favorable user reaction for users having a positive emotional state (e.g., positive/negative score from 0 to +1). The uplift modeler 224 may also determine which response (A or B) generated the most favorable user reaction for users having a negative emotional state (e.g., positive/negative score from −1 up to 0).

The uplift modeler 224 may determine the most favorable user reaction for any specific positive/negative score or for any range of positive/negative scores. The uplift modeler 224 may determine the most favorable user reaction for any user attribute, and is not limited to the positive/negative emotional state of the user. Further, the uplift modeler 224 may determine what segment(s) of users having more than one attribute in common had a more favorable reaction to query response A, and what segment(s) of users having more than one attribute in common had a more favorable reaction to query response B.

In one embodiment, uplift modeler 224 creates metrics 136 for operation of the self-support component 124 based on its determinations. Returning to an example of an A/B test related to an education tax credit, assume the uplift modeler 224 determines that response A generated the most favorable user reaction for users having a positive estimated emotional state. In such a case, the uplift modeler 224 creates a metric 136 that preferentially provides response A to a spoken query related to the education tax credit when the user submitting the query has a positive estimated emotional state. Likewise, if the uplift modeler 224 determined that response B generated the most favorable user reaction for users having a negative estimated emotional state, the uplift modeler 224 creates a metric 136 that includes instructions to provide response B to a spoken query related to the education tax credit when the user submitting the query has a negative estimated emotional state. The uplift model metrics 136 may also be created based on segment(s) of users having more than one attribute in common that have a more favorable reaction to one of the query responses A or B (e.g., including instructions in a metric to provide response A or B to users having a specific combination of attributes). The uplift model metrics 136 generated by the uplift modeler 224 may be stored at server 108.

The self-support component 124 includes a query response generator 212 that generates responses to queries received at voice component 226. For every spoken query received, the content identifier 214 analyzes the audio stream query 210 to identify content 228 in the query. The query response generator 212 then determines what subject matter is included in the content 228. For example, the query response generator 212 may compare the content 228 to a subject matter database 140 stored at server 108. Through this comparison, the query response generator 212 identifies a category or type of subject matter included in the received query. In one embodiment, the received query may include more than one category or type of subject matter.

The query response generator 212 retrieves, from a query response database 130 stored at server 108, one or more query responses that correspond to the identified subject matter in the received query. If the query response database 130 includes multiple possible responses corresponding to the subject matter identified in the received query, the query response generator 212 determines which response to present to the user. The query response generator 212 makes this determination using the A/B test metrics 134 generated by the A/B test generator 220, the uplift model metrics 136 generated by uplift modeler 224, and/or an estimated attribute 230 of the user estimated by the paralinguistics analyzer 216.

If an A/B test metric 134 is applicable to the identified subject matter in the received query, the response will be chosen based on the A/B test metric 134. For example, with respect to the example A/B test metric 134 described above, which includes instructions to alternate providing responses A and B for the next 100 instances where a query includes content 228 related to an education tax credit, the query response generator 212 will select response A or B according to this instruction for the next 100 instances in which a query includes content 228 related to the education tax credit.

If there is no applicable A/B test metric 134 for the subject matter of the content 228 in a received spoken query, the query response generator 212 chooses a response using the uplift model metrics 136 and an estimated attribute 230 of the user that submitted the query. For example, using the education tax credit example described above, once the 100 instances of a query related to the education tax credit have been received, the A/B test metric 134 is no longer applicable. Thus, when the next query related to the education tax credit is received, uplift model metrics 136 related to the estimated tax credit and the estimated user attribute 230 are used to select the response to provide to the user. For example, the paralinguistics analyzer 216 may analyze the user's spoken query and estimate that the user's positive/negative emotional state score is −0.5, which is a negative emotional state according to the scale and ranges described in the example attributes above. The example uplift model metric 136 described above includes instructions to provide response B to a query related to the education tax credit when the user submitting the query has a negative estimated emotional state. As such, the query response generator 212 would provide response B to the user.

Of course, while the example described above generates a query response using a metric and a user attribute in a singular way, the query response generator 212 may use multiple attributes of a user, apply multiple applicable uplift model metrics 136, and/or may select more than one response to present to the user. The attribute 230 of the user may correspond to estimated attribute(s) 232 used by the uplift modeler 224 to train the uplift model 132. That is, the same attribute(s) used by the uplift modeler 224 to train the uplift model 132 and generate uplift model metrics 136 are used to by the query response generator 212 to select a response to the user's query (e.g., in the example used above, both the attribute 230 and the attributes 232 for queries related to the education tax credit are the positive/negative emotional state of the users).

Figure 3:
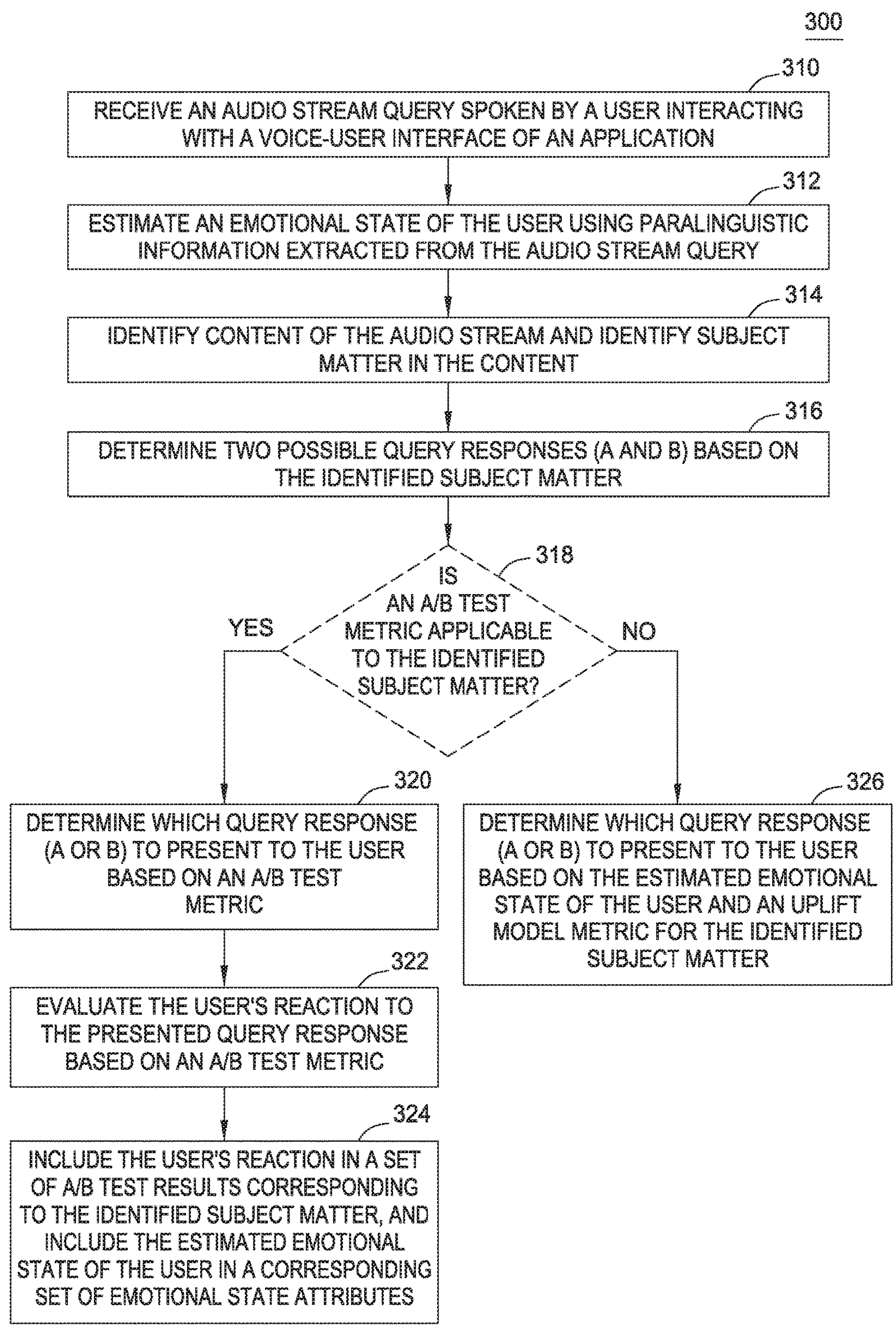
FIG. 3 illustrates a method for providing a response to a spoken self-support query, according to one embodiment.

FIG. 3 illustrates a method 300 for responding to a spoken statement of a user interacting with a software application, according to one embodiment. As shown in FIG. 3, the method 300 includes an embodiment in which a self-support audio stream query is received and responded to. However, in other embodiments, the same method 300 could be performed to respond to other types of spoken input received from the user. The method 300 beings at block 310 with receiving at a server 108 a self-support audio stream query 210 spoken by a user interacting with a voice-user interface of an application at a client system 104 or mobile device 106. At block 312, the paralinguistics analyzer 216 estimates an emotional state of the user using paralinguistic information extracted from the audio stream query 210. For example, paralinguistic information indicative of a positive or negative emotional state may be determined for a query 210 and used to estimate the positive/negative emotional state of the speaker. To do so, the paralinguistics analyzer 216 may compare the extracted paralinguistic information to information corresponding to attributes in a speech database 138. At block 314, the content identifier 214 identifies content 228 of the audio stream query 210 and identifies a subject matter in the content 228. The content 228 is identified using a speech recognition and/or pattern recognition technique. The subject matter is identified by comparing the identified content 228 in the query 210 to the subject matter database 140 stored at server 108. In one embodiment, more than one subject matter may be identified in the content 228.

At block 316, the query response generator 212 determines two possible query responses (A and B) based on the subject matter identified at block 314. The two possible query responses (A and B) may be determined by retrieving query responses corresponding to the identified subject matter from a query response database 130 stored at the server 108. In one embodiment, there may be more than two possible query responses to present to the user determined at block 316.

At block 318, the query response generator 212 determines whether any A/B test metrics 134 stored at the server 108 are applicable to the subject matter identified at block 314. If there is an applicable A/B test metric 134, the query response generator 212 determines at block 320 one of the two possible query responses (A or B) to present to the user based on the applicable A/B test metric 134 for the subject matter identified in the query 210. At block 322, the A/B test results component 222 evaluates the user's reaction to the presented query response (A or B) based on an A/B test metric 134. For example, as described above, evaluating the user's reaction may include detecting a possible user reaction defined by the A/B test metric 134, and assigning a favorability score to the user's reaction, with the favorability score for each possible user reaction being defined by an A/B test metric 134. At block 324, the user's reaction as evaluated at block 320 is included in a set of A/B test results 238 corresponding to the subject matter identified in the query 210 identified at block 314, and the emotional state of the user as estimated at block 312 is included in the corresponding set of emotional state attributes 232.

If, at block 318, the query response generator 212 determines that there is no A/B test metric 134 applicable to the subject matter identified at block 314, the query response generator 212 determines, at block 326, which query response (A or B) to present to the user based on the emotional state of the user estimated at block 312 and based on an uplift model metric 136 corresponding to the identified subject matter. The uplift model metric 136 used at block 326 to determine a query response to present to the user may have been created using the method 400 described below with respect to FIG. 4 below.

Figure 4:
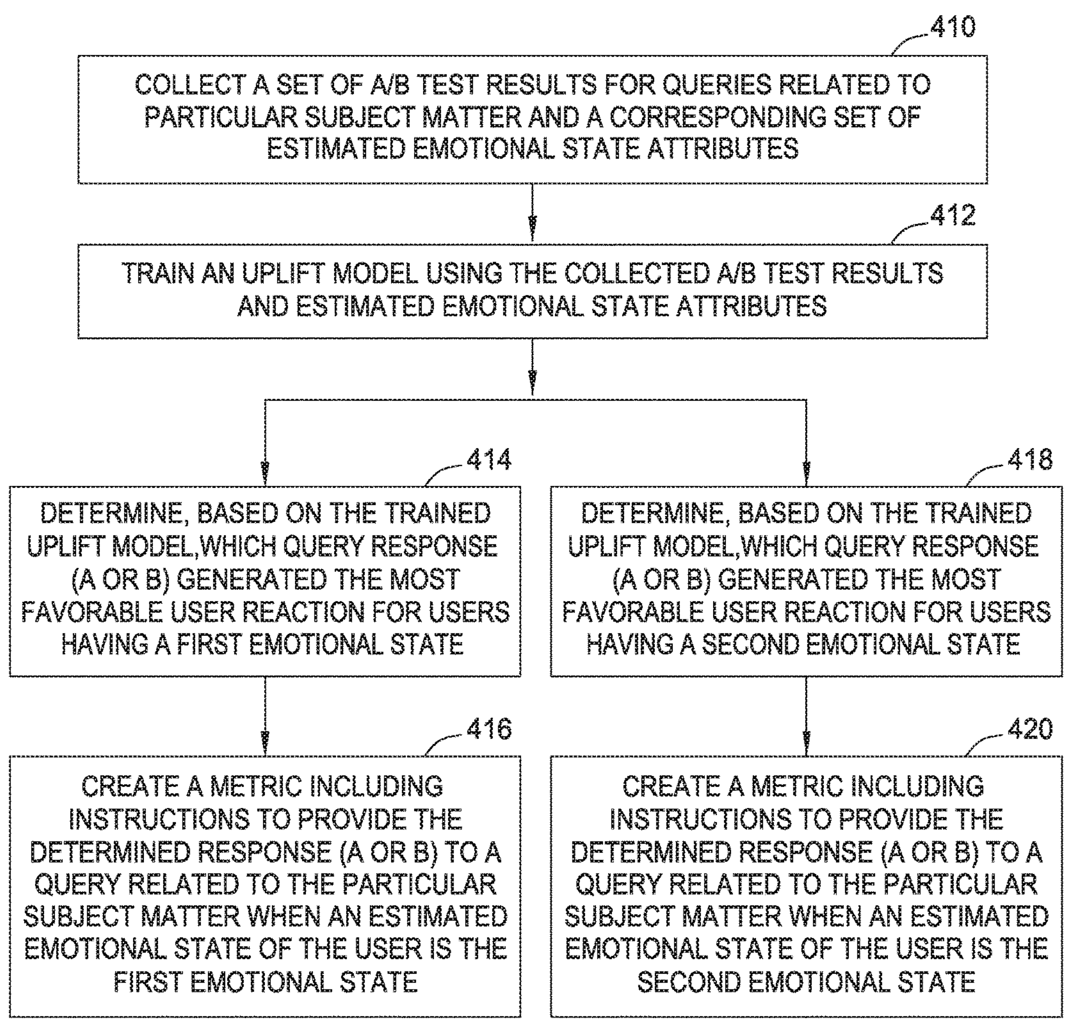
FIG. 4 illustrates a method for creating metrics for a self-support component, according to one embodiment.

FIG. 4 illustrates a method 400 to create favorable response metrics for a self-support component, according to one embodiment. The method 400 begins at block 410 with collecting at server 108 a set of A/B test results 238 for queries related to a particular subject matter and a corresponding set of estimated emotional state attributes 232. For example, the set of A/B test results 238 and the corresponding set of estimated emotional state attributes 232 collected at block 410 may have been generated at block 324 of method 300. At block 412, the uplift modeler 224 trains an uplift model 132 using the A/B test results 238 and estimated emotional state attributes 232 collected at block 410. At blocks 414 and 418, the uplift modeler 224 determines, based on the trained uplift model 132, which query response (A or B) generated the most favorable user reaction to a query related to the particular subject matter for users having a first and second emotional state, respectively.

At blocks 418 and 420, the uplift modeler 224 creates metrics 136 with instructions regarding which response (A or B) to include in response to a query related to the particular subject matter, according to the user's emotional state. For example, if, at block 414, it is determined that response A is the most favorable user reaction for users having the first emotional state, then at block 416, the created metric 136 includes instructions to provide response A to a query related to the particular subject matter when the user's estimated emotional state is the first emotional state. Likewise, if, at block 418, it is determined that response B is the most favorable user reaction for users having the second emotional state, then at block 420, the created metric 136 includes instructions to provide response B to a query related to the particular subject matter when the user's estimated emotional state is the second emotional state.

In one embodiment, the determinations at blocks 414 and 418 may involve determining what segment(s) of users having more than one attribute in common had a more favorable reaction to query response A, and what segment(s) of users having more than one attribute in common had a more favorable reaction to query response B. In such an embodiment, the uplift model metrics 136 created at blocks 418 and 420 would include instructions based on the determined segments of users having more than one attribute in common that had a more favorable reaction to one of the query responses A or B (e.g., a metric may have instructions to provide response A or B to a particular segment of users having more than one attribute common).

Embodiments described above are not limited to being performed with respect to the emotional state attribute of the user. Rather, the emotional state attribute described in the embodiments above may be replaced by or used in addition to one or more other attributes (e.g., gender, age, etc.) that may be estimated using paralinguistic information extracted from audio stream queries 210. Moreover, other factors may be used in addition to the use of user attributes estimated using paralinguistic information to determine how to respond to a user's self-support audio stream query. For example, in addition to using the user attributes estimated using paralinguistic information, any other available information about users, such as tax information, product click stream, etc., may be used in creating favorable response metrics for a self-support component and for determining how to respond to a particular user's self-support query. Further, embodiments described above are not limited to the use of A/B testing. The A/B testing described throughout may be replaced by or used in addition to any other type of alternative feature testing, such as multivariate testing, multi-armed bandit testing, etc.

Figure 5:
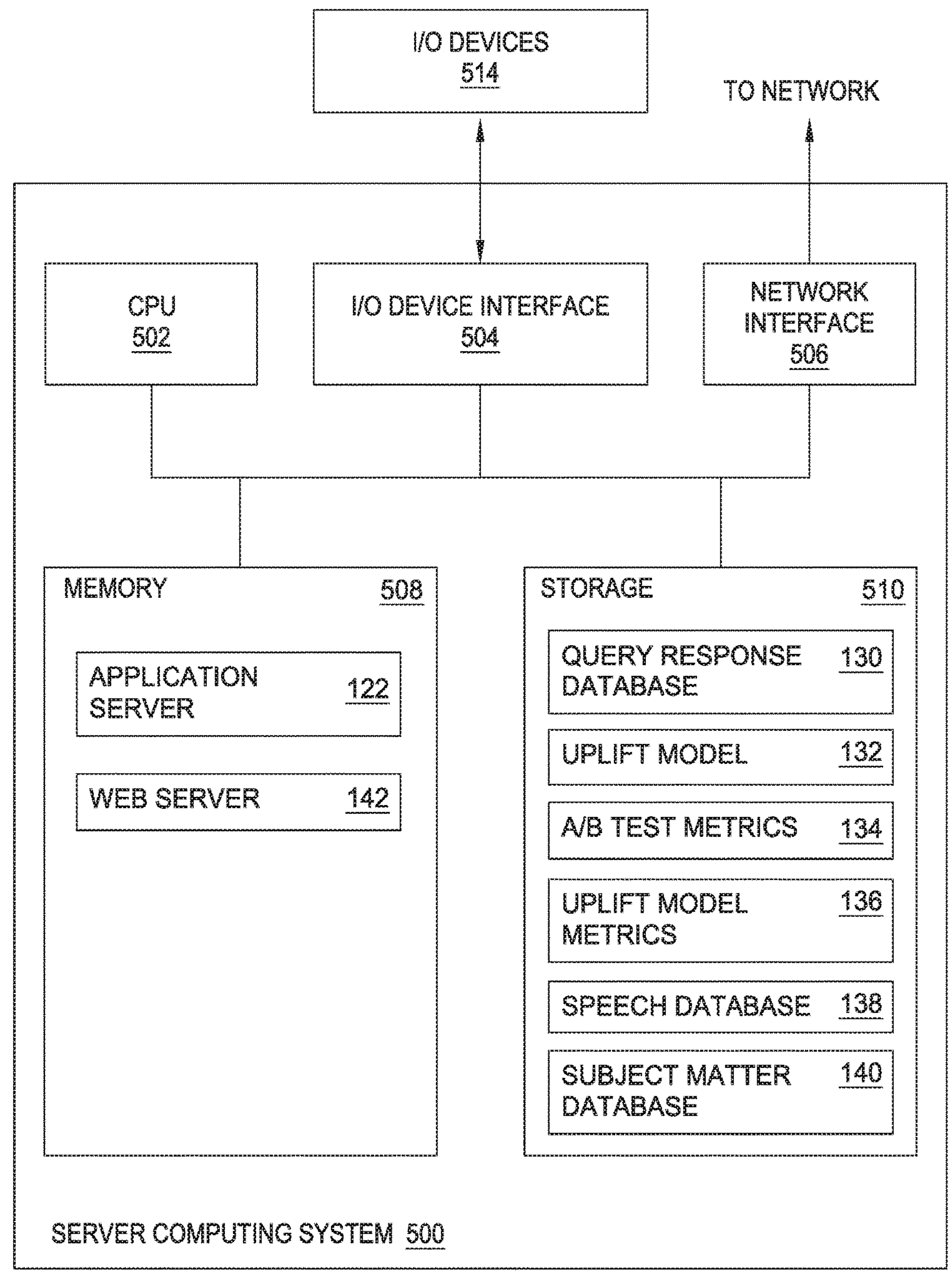
FIG. 5 illustrates an example computing system for generating metrics for a self-support component based on paralinguistic information extracted from voice/speech of a user, according to one embodiment.

FIG. 5 illustrates an example computing system 500 for generating metrics for a self-support component based on paralinguistic information extracted from voice/speech of a user, according to one embodiment. As shown, the computing system 500 includes, without limitation, a central processing unit (CPU) 502, one or more I/O device interfaces 704 connecting various I/O devices 514 (e.g., keyboards, displays, mouse devices, pen input, etc.) to the computing system 500, network interface 506, a memory 508, storage 510, and an interconnect 516.

CPU 502 may retrieve and execute programming instructions stored in the memory 708. Similarly, the CPU 502 may retrieve and store data residing in the storage 510. The interconnect 516 transmits programming instructions and data, among the CPU 702, I/O device interface 504, network interface 506, memory 508, and storage 510. CPU 502 can represent a single CPU, multiple CPUs, a single CPU having multiple processing cores, and the like. Additionally, the memory 508 represents random access memory. Furthermore, the storage 510 may be a disk drive. Although shown as a single unit, the storage 510 may be a combination of fixed or removable storage devices, such as fixed disc drives, removable memory cards or optical storage, network attached storage (NAS), or a storage area-network (SAN).

As shown, memory 508 includes application server 122 and web server 142. The web server 142 receives a self-support query input by a user, and returns a response generated by the application server 122. The application server 122 generates the response by selecting which response from the query response database 130 to provide to the user. The application server 122 selects the response based on subject matter identified in the self-support query, an attribute of the user estimated using paralinguistic information extracted from the self-support query, A/B test metrics 134 in storage 510, and/or uplift model metrics 136 in storage 510. The attribute of the user is estimated using the speech database 138 in storage 510, and the subject matter is identified using the subject matter database 140 in storage 510. The uplift model 132 used to create the uplift model metrics 136 is also stored in storage 510.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for selecting a response to an audio stream query, the method comprising:
- receiving, over a network, a self-support query including spoken content from a user recorded by a remote mobile device;
- determining a set of paralinguistic features from the spoken content;
- estimating an emotional state of the user based on the set of paralinguistic features;
- identifying text strings representing subject matter based on the spoken content in the audio stream query;
- determining two or more query responses corresponding to the text strings representing the subject matter;
- selecting, from a query response database, one of the query responses to present to the user based, at least in part, on the emotional state of the user and an uplift model used to select query responses for users with the emotional state;
- receiving, over the network from the remote mobile device, a user reaction to the query response;
- determining a favorability metric associated with the user reaction;
- updating the uplift model based on the attribute of the user, the user reaction and the favorability metric; and
- based on updating the uplift model, transmitting an additional query response to the remote mobile device, wherein the additional query response is selected based on the uplift model for users with the emotional state of the user.

2. The method of claim 1, wherein the uplift model is trained using a set of A/B test results corresponding to a plurality of spoken queries referencing the identified subject matter and using a set of user attributes comprising at least one user attribute corresponding to each of the plurality of spoken queries.

3. The method of claim 2, wherein the A/B test results are gathered according to A/B test metrics, wherein the A/B test metrics define:
- parameters of an A/B test;
- a plurality of user reactions to the A/B test; and
- a favorability score corresponding to each user reaction.

4. The method of claim 2, wherein the set of user attributes comprise emotional state attributes.

5. The method of claim 1, wherein the attribute of the user estimated from the set of paralinguistic features comprises an emotional state of the user.

6. The method of claim 1, wherein estimating the attribute of the user based on the set of paralinguistic features comprises comparing the paralinguistic features to attributes in the speech database.

7. The method of claim 1, wherein identifying subject matter corresponding to the spoken content in the audio stream query comprises comparing the spoken content to types of subject matter in a database.

8. A non-transitory computer-readable storage medium containing instructions that, when executed by one or more processors, perform an operation for selecting a response to an audio stream query, the operation comprising:

receiving, over a network, a self-support query including spoken content from a user recorded by a remote mobile device;

determining a set of paralinguistic features from the spoken content;

estimating an emotional state of the user based on the set of paralinguistic features;

identifying text strings representing subject matter based on the spoken content in the audio stream query;

determining two or more query responses corresponding to the text strings representing the subject matter;

selecting, from a query response database, one of the query responses to present to the user based, at least in part, on the emotional state of the user and an uplift model used to select query responses for users with the emotional state;

receiving, over the network from the remote mobile device, a user reaction to the query response;

determining a favorability metric associated with the user reaction;

updating the uplift model based on the attribute of the user, the user reaction and the favorability metric; and based on updating the uplift model, transmitting an additional query response to the remote mobile device, wherein the additional query response is selected based on the uplift model for users with the emotional state of the user.

9. The computer-readable storage medium of claim 8, wherein the uplift model is trained using a set of A/B test results corresponding to a plurality of spoken queries referencing the identified subject matter and using a set of user attributes comprising at least one user attribute corresponding to each of the plurality of spoken queries.

10. The computer-readable storage medium of claim 9, wherein the A/B test results are gathered according to A/B test metrics, wherein the A/B test metrics define:

parameters of an A/B test;

a plurality of user reactions to the A/B test; and a favorability score corresponding to each user reaction.

11. The computer-readable storage medium of claim 9, wherein the set of user attributes comprise emotional state attributes.

12. The computer-readable storage medium of claim 8, wherein the attribute of the user estimated from the set of paralinguistic features comprises an emotional state of the user.

13. The computer-readable storage medium of claim 8, wherein estimating the attribute of the user based on the set of paralinguistic features comprises comparing the paralinguistic features to attributes in the speech database.

14. The computer-readable storage medium of claim 8, wherein identifying subject matter corresponding to the spoken content in the audio stream query comprises comparing the spoken content to types of subject matter in a database.

15. A system, comprising:

one or more processors; and memory storing one or more applications, which, when executed on the one or more processors perform an operation for selecting a response to an audio stream query, the operation comprising:

receiving, over a network, a self-support query including spoken content from a user recorded by a remote mobile device;

determining a set of paralinguistic features from the spoken content;

estimating an emotional state of the user based on the set of paralinguistic features;

identifying text strings representing subject matter based on the spoken content in the audio stream query;

determining two or more query responses corresponding to the text strings representing the subject matter;

selecting, from a query response database, one of the query responses to present to the user based, at least in part, on the emotional state of the user and an uplift model used to select query responses for users with the emotional state;

receiving, over the network from the remote mobile device, a user reaction to the query response;

determining a favorability metric associated with the user reaction;

updating the uplift model based on the attribute of the user, the user reaction and the favorability metric; and based on updating the uplift model, transmitting an additional query response to the remote mobile device, wherein the additional query response is selected based on the uplift model for users with the emotional state of the user.

16. The system of claim 15, wherein the uplift model is trained using a set of A/B test results corresponding to a plurality of spoken queries referencing the identified subject matter and using a set of user attributes comprising at least one user attribute corresponding to each of the plurality of spoken queries.

17. The system of claim 15, wherein the attribute of the user estimated from the set of paralinguistic features comprises an emotional state of the user.

18. The system of claim 16, wherein the A/B test results are gathered according to A/B test metrics, wherein the A/B test metrics define:

parameters of an A/B test;

a plurality of user reactions to the A/B test; and a favorability score corresponding to each user reaction.

19. The system of claim 15, wherein estimating the attribute of the user based on the set of paralinguistic features comprises comparing the paralinguistic features to attributes in the speech database.

20. The system of claim 15, wherein identifying subject matter corresponding to the spoken content in the audio stream query comprises comparing the spoken content to types of subject matter in a database.

* * * * *